Jan. 31, 1939.  E. S. HINELINE  2,145,793
CAMERA STRUCTURE, PARTICULARLY FOR COLOR SEPARATION
Filed July 16, 1937  5 Sheets—Sheet 1

INVENTOR.
Filson S. Hineline
BY
his ATTORNEYS

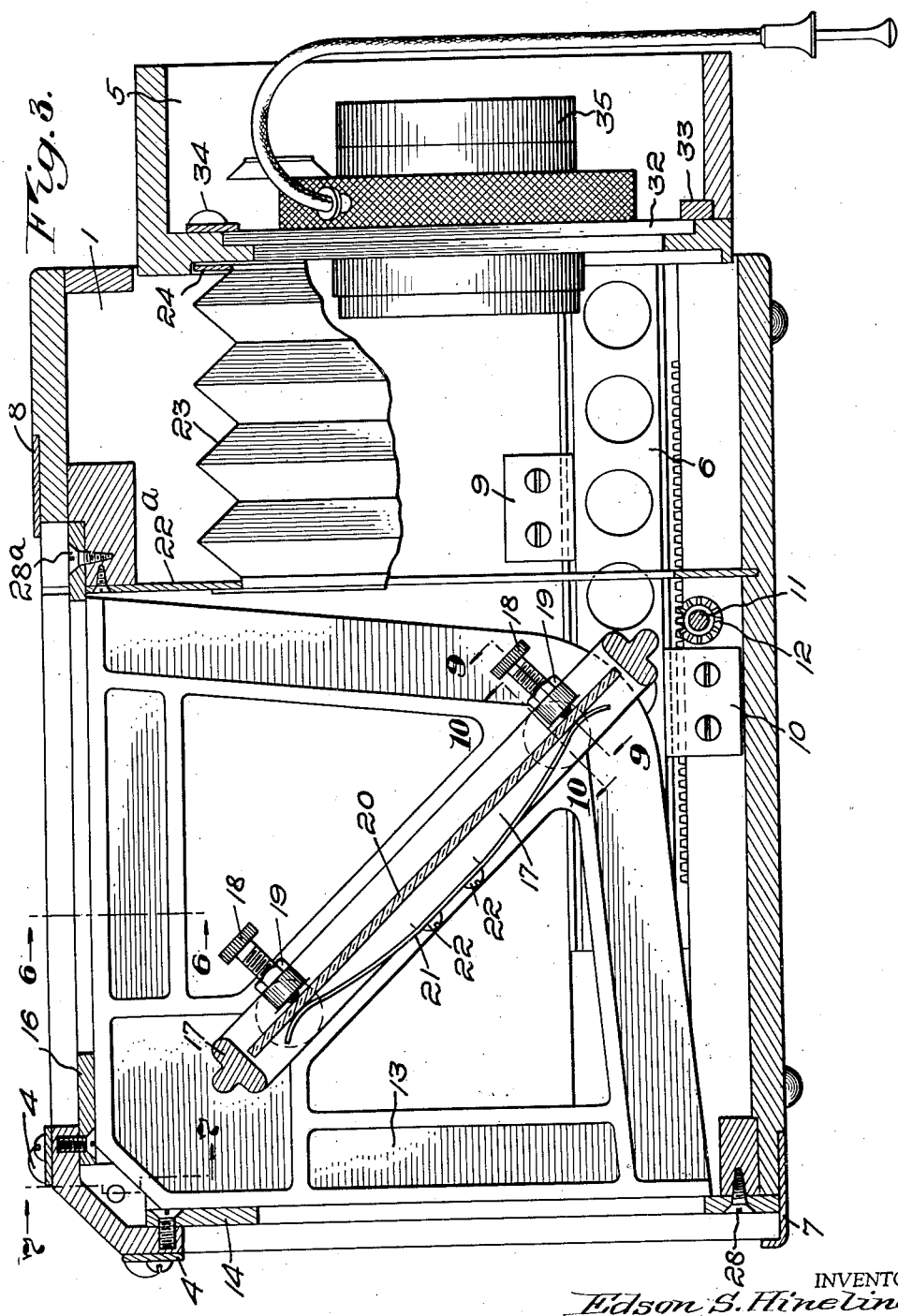

Jan. 31, 1939.   E. S. HINELINE   2,145,793
CAMERA STRUCTURE, PARTICULARLY FOR COLOR SEPARATION
Filed July 16, 1937   5 Sheets-Sheet 3
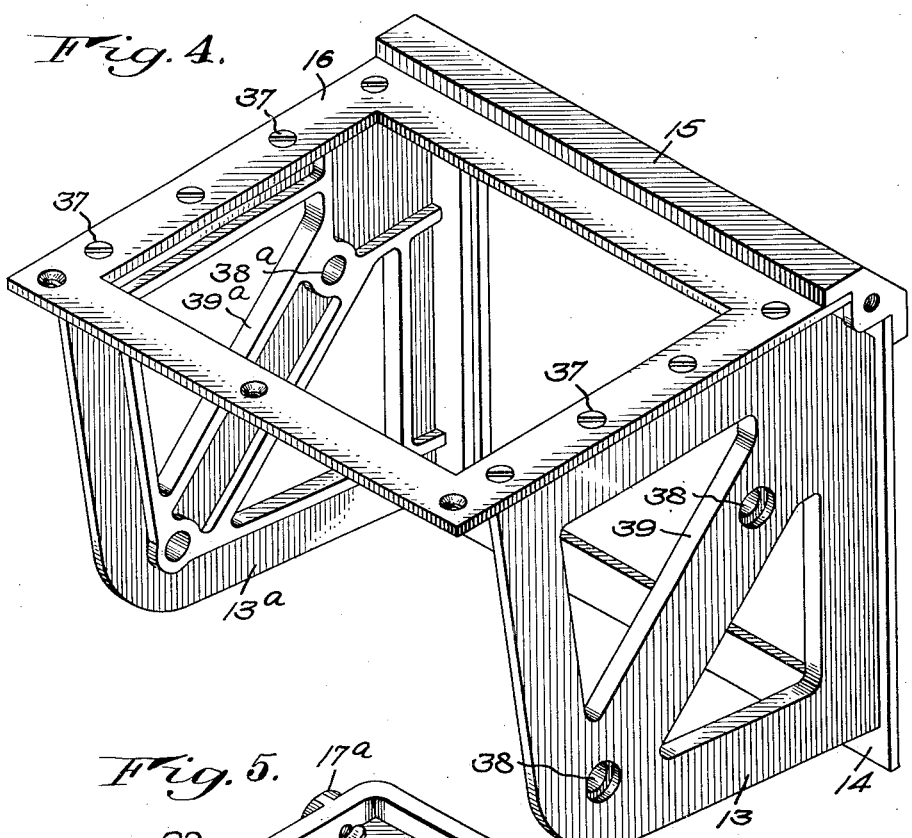
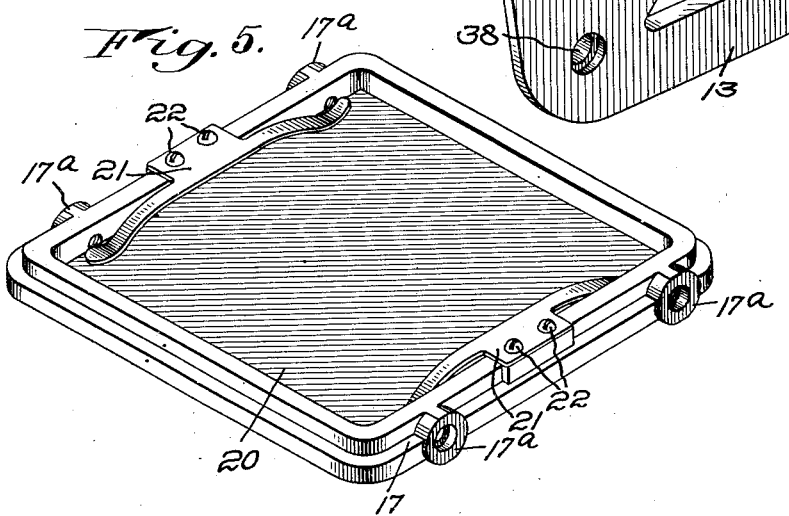
INVENTOR.
Edson S. Hineline
BY
his ATTORNEYS Jan. 31, 1939.　　　E. S. HINELINE　　　2,145,793
CAMERA STRUCTURE, PARTICULARLY FOR COLOR SEPARATION
Filed July 16, 1937　　　5 Sheets-Sheet 4
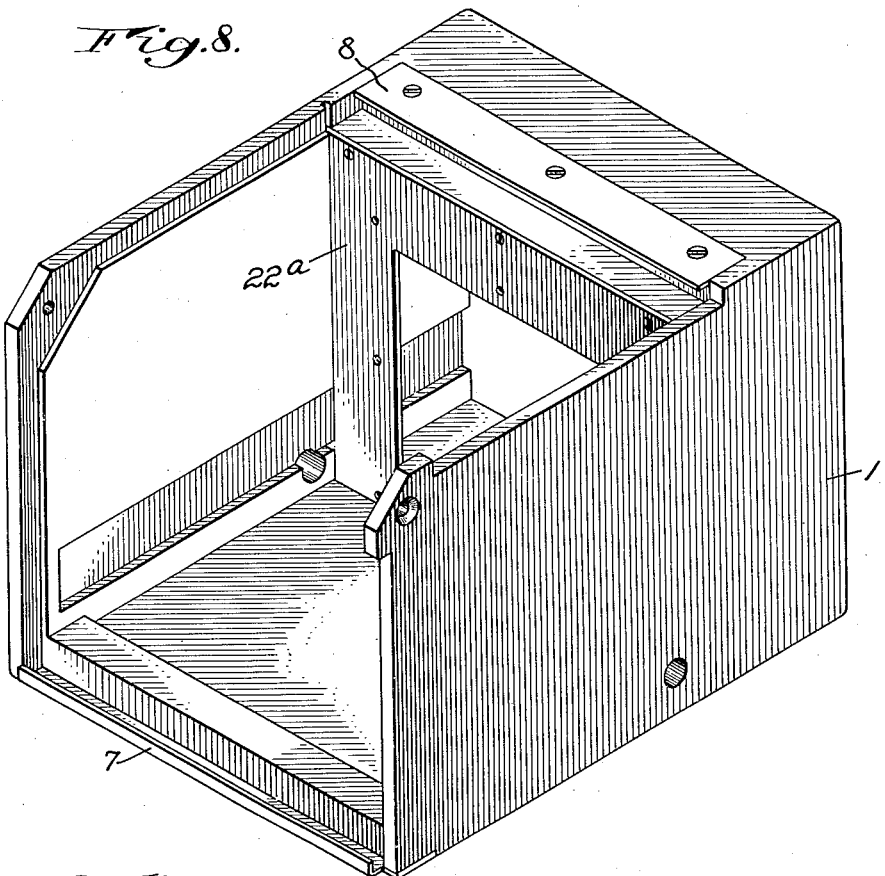
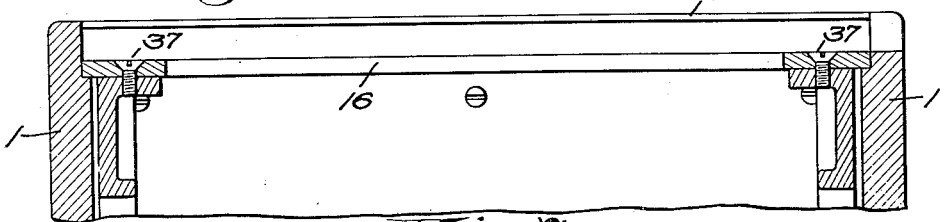
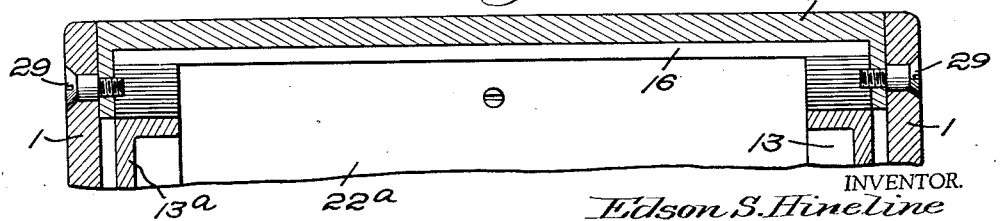
INVENTOR.
Edson S. Hineline
BY
his ATTORNEYS Jan. 31, 1939.   E. S. HINELINE   2,145,793
CAMERA STRUCTURE, PARTICULARLY FOR COLOR SEPARATION
Filed July 16, 1937   5 Sheets-Sheet 5

INVENTOR.
Edson S. Hineline
BY
his ATTORNEYS

Patented Jan. 31, 1939

2,145,793

UNITED STATES PATENT OFFICE 2,145,793

CAMERA STRUCTURE, PARTICULARLY FOR COLOR SEPARATION

Edson S. Hineline, Rochester, N. Y., assignor to The Folmer Graflex Corporation, Rochester, N. Y., a corporation of Delaware Application July 16, 1937, Serial No. 153,959

8 Claims. (Cl. 95—2)

This invention relates to novel camera construction, and particularly of cameras used for making two or more color separation negatives simultaneously. This particular camera is arranged so that either two color separations can be made, or, by using a bi-pack in the upper plate holder, three color separations can be made. I am aware that it is not new to make two or more color separation negatives at one exposure in a camera, this having been done for years, but no satisfactory camera that was light enough in weight to be portable as a hand camera, has yet been constructed with sufficient rigidity and strength to maintain absolute register in two or more negatives, which is a requisite of a color separation camera.

This invention relates particularly to a structure that is easy to manufacture and yet will remain in perfect register throughout its life. The unique feature of this camera is a mirror chassis structure made up of castings and metal plates, so designed that the metal masses are such that even though shape changes due to temperature changes occur, the mirror will remain in a position exactly between the two exposure zones.

There have been metal cameras constructed which have attempted to do what I have accomplished by this invention, but they have all had serious drawbacks due to the arrangement of the metal masses and their extreme weight. The mirror metal chassis in the construction herein disclosed is enclosed in a wood box. The mirror metal chassis is mounted in such a way that even though the wood parts of the camera have changed due to atmospheric conditions or otherwise, the register between the two photographic surfaces is not altered. The wood enclosure further lends itself as a cushion against sudden jars or bumps that would permanently disarrange an all metal camera. It will be noted from the following description that the mirror chassis is a structure that in itself is very rigid and even though the enclosing box were distorted to a considerable extent, it would not change the mirror chassis shape. This, I believe to be a unique construction, and in practice it has worked out most satisfactorily.

I will now more fully describe as the preferred embodiment of the invention the particular structure herein disclosed, but to which exact embodiment my invention is not limited.

Fig. 3 is a cross section of Fig. 2 on line 3—3 thereof, showing the general placement of parts, particularly the relation of the mirror chassis to the box structure;

Fig. 4 is a perspective view of the mirror chassis but with the mirror frame removed;

Fig. 5 is a perspective view of the mirror frame;

Fig. 6 is an enlarged section on dotted line 6—6 of Fig. 3;

Fig. 7 is an enlarged section on dotted line 7—7 of Fig. 3;

Fig. 8 is a perspective view of the wooden box structure;

Figure 1:
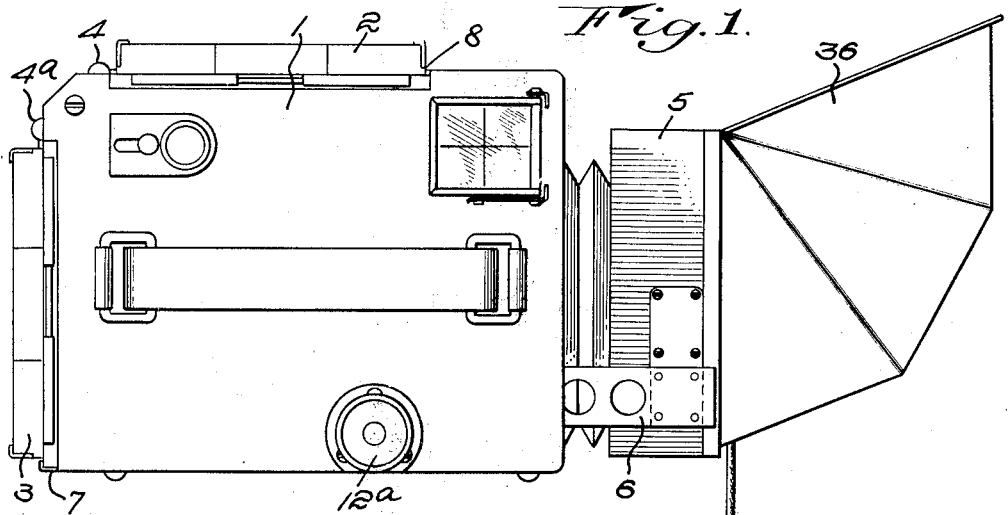
Fig. 1 is a side view of the camera with the plate holders in position, the bellows partly extended and the lens shade open.

A preferred construction embodying my invention, but to which I am not limited, is as follows:

Referring to Fig. 1, the camera box is indicated at 1, the upper plate holder at 2, and the rear plate holder at 3. These plate holders are of the single sheet type with pressure back. They are held in place on the camera through slide locks 4 and 4a, angle piece 7 and extended metal piece 8, shown very clearly in Figs. 1, 2 and 3.

Attached to the front box of the camera is a rack 6 which is caused to move forward and backward through pinion gear 11 on shaft 12, Fig. 3. To the shaft 12 is connected a knob 12a, clearly shown in Figs. 1 and 2, for turning the shaft 12 and pinion gear 11 in a direction to cause the rack 6 to be moved in or out of the camera box, carrying with it the camera front box 5. The rack 6 is held in proper position and guided within the camera by guide plates 9 and 10, shown in Fig. 3.

Figure 9:
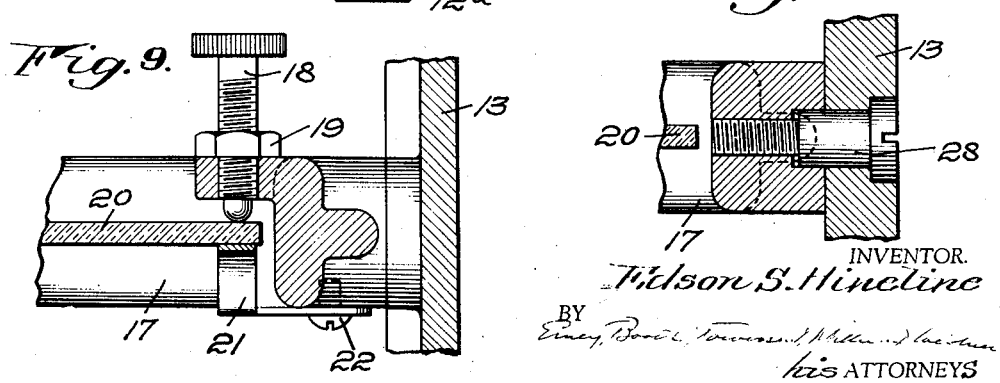
Fig. 9 is a sectional detail on the line 9—9 of Fig. 3.

The rear part of the camera contains the mirror chassis structure, very clearly shown in Fig. 4, and which consists of two side, preferably cast metal, plates 13, 13a, a back metal plate 14, corner metal bracket 15, and a metal top plate 16, which parts are also clearly shown in Fig. 3. Supported between the plates 13 and 13a is a mirror frame 17, Fig. 5, having made as an integral part therewith four bosses 17a through which screws 18 pass, being held in a locked position with jam nuts 19 (Figs. 3 and 9). A mirror 20 is held in contact with screws 18, 18 by a pressure spring 21 held to casting 17 with screws 22.

It will be readily seen that the plane of the mirror 20 can easily be adjusted and said mirror be locked into place, by first loosening the jam nuts 19, and then adjusting the screws 18, 18, then again locking said jam nuts 19. The mirror 20 thus will always be held in a fixed plane. The mirror chassis with the mirror assembled therewith is positioned at the proper period of assembly in the outer wood box of the camera, shown in Fig. 8, as ready to receive said chassis.

Figure 10:
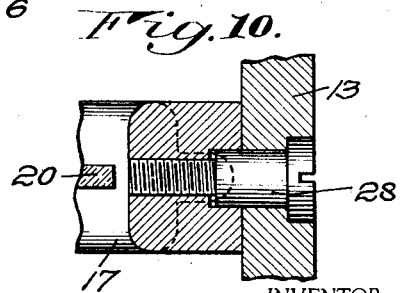
Fig. 10 is a sectional detail on dotted line 10—10, Fig. 3.
Figure 11:
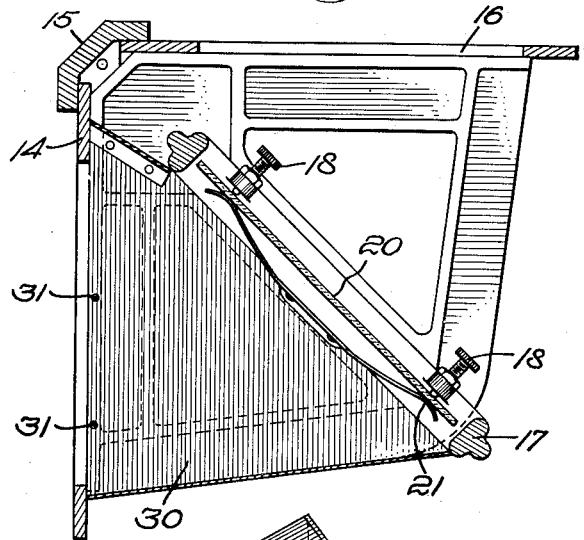
Fig. 11 is a cross sectional view similar to a part of Fig. 11 but on a smaller scale, of the mirror chassis structure showing the placement of the light shield of Fig. 12.
Figure 12:
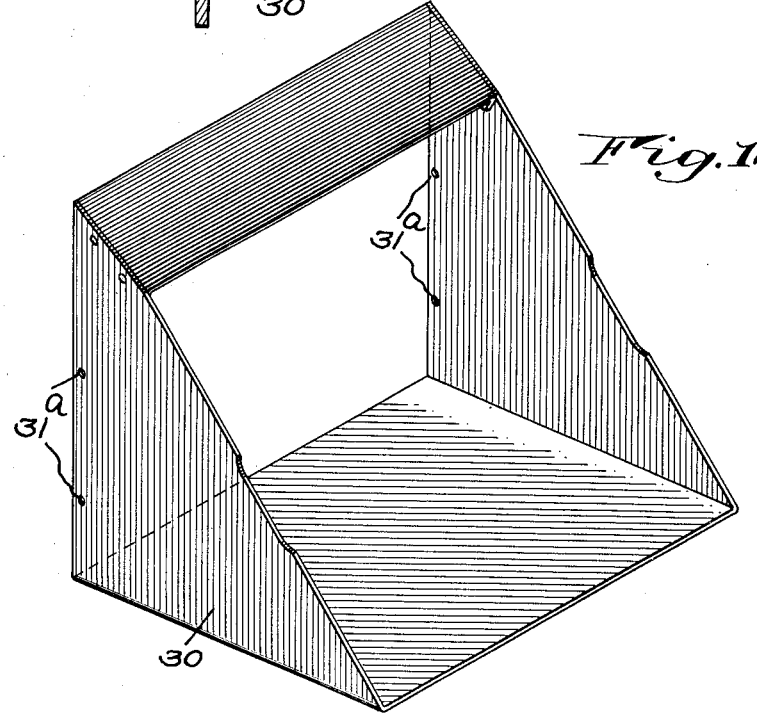
Fig. 12 is a detailed view of the light shield.

Separating the rear compartment of the camera from the front compartment is a bellows frame 22a to which is attached a bellows 23, which is in turn attached to the front box 5 through a second bellows frame 24, thus keeping the camera, from the lens rearward, light tight. When the mirror frame 17 is positioned between and received by the side plates 13, 13a of the mirror chassis structure, a complete assembly is formed, more clearly shown in section in Fig. 11 ready for insertion in the box structure of Fig. 8. Fig. 6 clearly shows that the said upper plate 16 of the mirror chassis structure is attached to side plates 13, 13a by screws 37, 37. Fig. 7 clearly shows that the mirror chassis assembly is held into the outer wooden box 1 with screws 29, 29. In order securely to anchor the mirror frame 17 to the side plates 13, 13a, so as to form an accurate alignment, dowel screws 28, one of which is shown in Fig. 10, are used to fasten the mirror frame 17 to said side plates 13, 13a, of the mirror chassis structure. The manner of adjustment of the mirror 20 by the mirror adjusting screws 18 is clearly shown in the enlarged detail, Fig. 9. After the mirror chassis structure has been assembled as shown in Fig. 4, and the mirror frame has been assembled as shown in Fig. 5, and the two have been assembled as shown in cross section in Figs. 3 and 11, a complete self-supporting unit is formed for accurately holding the alignment of the mirror 20 and plate holder plate 16 and plate holder plate 14 in perfect alignment, regardless of temperature changes and atmospheric conditions. This assembly is then mounted into the camera within the box 1 thereof (Fig. 8), as most clearly shown in Fig. 3, with mounting screws 28a, 28a and 29, 29. To prevent light reaching the sensitized plate held in the rear holder 3 by being reflected from the upper holder 2 or any internal parts of the camera, a light shield 30, clearly shown in Fig. 12, is attached to the plate holder mirror chassis assembly by screws 31, 31, holes 31a being provided for this purpose. Said light guard has been omitted from Fig. 3 so as more clearly to show the internal construction of parts. Fig. 11 shows the construction of the light guard very clearly, with the hidden part of casting 13 indicated in dotted lines.

As previously pointed out, in a camera making two or more exposures simultaneously, one exposure being made directly through a mirror and the second exposure being made by a partial reflection of the light by a mirror, such mirror must be held in absolute alignment with both the focal planes, namely, that of upper plate holder 2 and that of rear plate holder 3.

There have been many cameras constructed of various materials such as wood and metal intended to accomplish this purpose, but to my knowledge none of these structures has been wholly satisfactory because of conditions previously set forth. It can be seen very clearly from the construction herein disclosed, that the entire structure in so far as alignment is concerned, namely, the maintaining of the position of focal planes of plate holders 2 and 3 with respect to the mirror 20, completely accomplishes the purpose of my invention.

In the design of the various parts entering into the herein disclosed mirror chassis construction, I have taken into consideration the expansion and contraction of metals. The castings 13, 13a have been so designed that any change in the metal due to expansion or contraction will not cause a displacement of the relation of the mirror 20 to the focal planes of the plate holders 2 and 3, as will appear from an analysis of the structure shown in Fig. 4.

I have built several cameras incorporating the structure and design best disclosed in Fig. 4, and they have proven the accuracy of the foregoing statement.

Referring again to mirror 20, it is to be understood that it can be a mirror of plain glass with optical flat surfaces and partially coated with a reflecting material on that surface nearest the lens, or a red pot glass can be used and coated as just stated. The mirror then becomes a combination mirror and filter.

As shown most clearly in Fig. 3, a lens board 32 is fitted into an opening in the box 5 and is held in position by the block 33 and the slide lock 34. To the lens board 32 is attached a regular photographic lens and shutter 35 of suitable construction. Also fastened to the front box 5 of the camera is a collapsible lens shade 36, shown clearly in Figs. 1 and 2.

Figure 2:
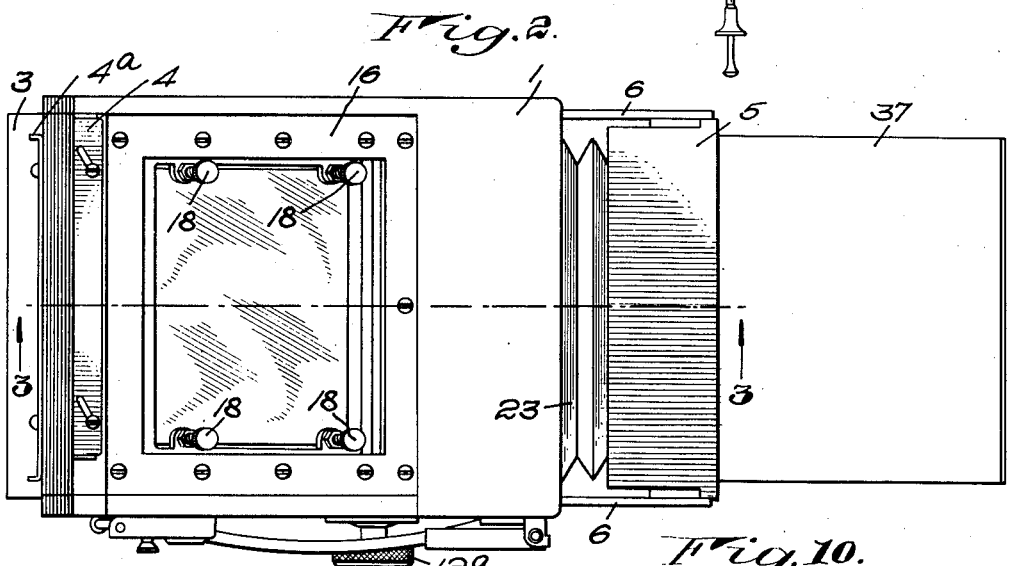
Fig. 2 is a top plan view of Fig. 1 with the upper plate holder removed, clearly showing the position of the mirror.

When the camera is closed by racking back the rack bar 6 through pinion 11, shaft 12 and knob 12a, the box 5 is caused to be wholly concealed in the camera box 1. The lens door 37, Fig. 2, is then closed, making an entirely enclosed camera.

Referring to Figs. 4 and 5, the side plates 13, 13a are provided with holes 38, 38a to receive the dowel screws 28. Said side plates 13, 13a are each desirably made of a substantially square or rectangular open or skeleton form having diagonal members 39, 39a as clearly shown in Fig. 4, in which the said holes 38, 38a are provided to receive the mirror frame in the proper inclined position, as illustrated in Figs. 3 and 11.

The side plates 13, 13a are not merely pieces of metal with portions cut out therefrom, but on the contrary they are so designed, shaped and assembled with respect to the other parts, so that they contribute to a definite purpose (namely, they constitute a means for holding the two plate holders 2 and 3 whose planes are exactly ninety degrees from each other, and the mirror 20 whose plane is exactly forty-five degrees with respect to that of the two said plate holders). The structure is such that regardless of any contraction or expansion of the side metal plates, such condition will maintain. Such condition will maintain regardless of the position in which the camera is held, as all of the respective parts are permanently fastened together and retained in the herein described highly precisioned position. This condition will maintain regardless of what takes place in the way of contraction or expansion or swelling or shrinking of the outer case. There is thus provided a new structure worked out after very considerable experimentation.

Furthermore a color camera that can be manufactured in quantities should be so designed that the parts can be fabricated in quantity and be interchangeable in a series of cameras, so that when an assembly of the various parts is made up, the mirror can be adjusted before the placement in the camera to a high degree of accuracy. It is important that the mirror must not only be kept at an angle of forty-five degrees with respect to each of the plate holder planes, but the face of the mirror must also be maintained in a fixed position. That is to say, if the mirror, while at an angle of forty-five degrees to the planes of the plate holders 2 and 3, were to be slightly displaced from its position, one of the two images would be out of focus, and if the lens were stopped down sufficiently to gain depth of focus great enough to have sharp images, one image would be larger than the other, thereby preventing registration on the final prints. In the structure herein disclosed, the placing of the plate holders on the camera box itself has nothing to do with the placement of the mirror, which is always in a predetermined, fixed position, to which it is accurately adjusted before the camera is assembled.

It is essential that the position of the mirror be adjusted with the utmost accuracy. A difference of .001 or .002 of an inch would mean the difference between a properly operating camera and one that does not operate properly.

It will be realized from the foregoing description that I have provided an assembly of parts that can be held in the described positions to insure precision work. I have mounted that assembly of parts in a housing in such manner that such housing will support the said assembly of parts and at the same time protect it from injury. I have thus provided a complete working camera that can be used without any unusual instructions or precautions.

In the embodiment of the invention herein disclosed, the camera is represented as a hand camera but my invention is not so limited (though that is the preferred structure), since the principle of my invention may be embodied in other cameras of relatively light weight but which, for example, may be built with a gimbal or a tripod, in such way that the mounting is of a permanent nature. Such structure is within the scope of my invention.

Having thus described one illustrative embodiment of the invention, it is to be understood that although specific terms are employed, they are used in a generic and descriptive sense and not for purposes of limitation, the scope of the invention being set forth in the following claims.

I claim:

1. A camera structure, particularly adapted to be used in the making of color-separation negatives simultaneously, including a wholly enclosing non-metallic box acting as a cushion for and entirely enclosing the contained parts on all faces and constituting a permanent attached part of the camera, a mirror-chassis structure composed wholly of metal parts, and adapted with a mirror and mirror frame to be assembled wholly inside of and to be secured to said box, said chassis-structure parts including two spaced side members, a top cross plate secured to said side members and having a formation adapting it to receive a plate holder, a back cross plate also secured to said side members and also having a formation adapting it to receive a plate holder, the said side members each being of substantially rectangular, open form and having diagonal portions extending downwardly thereacross, a metallic mirror frame having a mirror mounted therein, said mirror frame being fixedly secured in permanent position to said diagonal portions, so that it is in permanent angular relation to both of said plate-holder supporting plates, whereby a self-contained, unitary camera structure is provided.

2. A camera structure, particularly adapted to be used in the making of color separation negatives simultaneously, including a wholly enclosing non-metallic box acting as a cushion for and entirely enclosing the contained parts on all faces and constituting a permanent part of the camera structure, a mirror chassis completely enclosed within and fixedly secured to the said box, a movable camera front also received within said box between said chassis and the front of said box and constituting a permanent part of the camera, said mirror chassis being composed wholly of metallic parts and constituting in itself a unitary, self-contained structure that is wholly enclosed within said box, and having a mirror and mirror frame mounted therein, said metal parts of the chassis including two spaced side members, a top transverse member and a back transverse member both rigid with said side members and forming therewith an open, rigid unitary receptacle wherein said mirror frame with its mirror is mounted in fixed permanent position so as to be held in unchanging relation to said top and said back transverse members, and which receptacle is thus wholly enclosed and cushioned within said box.

3. A camera structure, particularly adapted to be used in the making of color separation negatives simultaneously, including a wholly enclosing non-metallic box acting as a cushion for and entirely enclosing the contained parts on all faces and constituting a permanent part of the camera structure, a mirror chassis completely enclosed within and fixedly secured to the said box, a movable camera front also received within said box between said chassis and the front of said box and constituting a permanent part of the camera, said mirror chassis being composed wholly of metal parts and constituting in itself a unitary, self-contained structure, and having a mirror and mirror frame mounted therein, means for adjusting the plane of said mirror in and with respect to said mirror frame, said metal parts of the chassis including two spaced side members, a top transverse member and a back transverse member both rigid with said side members and forming therewith an open, rigid, unitary receptacle wherein said mirror frame with its mirror is mounted in fixed permanent position so as to be held in unchanging relation to said top and said back transverse members, and which receptacle is thus wholly enclosed and cushioned within said box.

4. A camera structure, particularly adapted to be used in the making of color separation negatives simultaneously, including a wholly enclosing non-metallic box acting as a cushion for and entirely enclosing the contained parts on all faces and constituting a permanent part of the camera structure, a mirror chassis completely enclosed within and fixedly secured to the said box, a movable camera front also received within said box between said chassis and the front of said box and constituting a permanent part of the camera, said mirror chassis being composed wholly of metallic parts and constituting in itself a unitary, self-contained structure, and having a mirror and mirror frame mounted therein, said metal parts of the chassis including two spaced side members, a top transverse member and a back transverse member both rigid with said side members and forming therewith an open, rigid, unitary receptacle wherein said mirror frame with its mirror is mounted in fixed permanent position so as to be held in unchanging relation to said top and said back transverse members, and which receptacle is thus wholly enclosed and cushioned within said box, together with a light shield positioned within said mirror chassis.

5. A camera structure, particularly adapted to be used in the making of color separation negatives simultaneously, including a wholly enclosing non-metallic box acting as a cushion for and entirely enclosing the contained parts on all faces and constituting a permanent part of the camera structure, a mirror chassis completely enclosed within and fixedly secured to the said box, a movable camera front also received within said box between said chassis and the front of said box and constituting a permanent part of the camera, said mirror chassis being composed wholly of metal parts and constituting in itself a unitary self-contained structure, and having a mirror and mirror frame mounted therein, said metal parts of the chassis including two spaced side members, a top transverse member and a back transverse member both rigid with said side members and forming therewith an open, rigid, unitary receptacle wherein said mirror frame with its mirror is mounted in fixed permanent position so as to be held in unchanging relation to said top and said back transverse members, and which receptacle is thus wholly enclosed and cushioned within said box, said metallic mirror chassis having its metal masses distributed, proportioned and relatively arranged so that when shape changes due to temperature changes occur the said mirror will remain in accurate functioning position.

6. A camera structure, particularly adapted to be used in the making of color separation negatives simultaneously, including a wholly enclosing non-metallic box acting as a cushion for and entirely enclosing the contained parts on all faces and constituting a permanent part of the camera structure, a mirror chassis completely enclosed within and fixedly secured to the said box, a camera front also received within said box between said chassis and the front of said box and operatively associated with said mirror chassis in front thereof and constituting a permanent part of the camera, said mirror chassis being composed wholly of metal parts and constituting in itself a unitary self-contained structure, and having a mirror and mirror frame mounted therein, said metal parts of the chassis including two spaced side members, a top transverse member and a back transverse member both rigid with said side members and forming therewith an open, rigid, unitary receptacle wherein said mirror frame with its mirror is mounted in fixed permanent position so as to be held in unchanging relation to said top and said back transverse members, and which receptacle is thus wholly enclosed and cushioned within said box.

7. A camera structure adapted to be used in the making of color-separation negatives simultaneously, including an outer cushioning box enclosing the contained parts at least wholly at top and bottom and wholly at the two sides and constituting a permanent attached part of the camera, a mirror chassis structure composed wholly of metal parts and adapted with a fixedly positioned mirror and mirror frame to be assembled wholly inside of and to be secured to said cushioning box, said chassis structure parts including two spaced side members, a top cross plate secured to said side members and having a formation adapting it to receive a sensitized surface holder, a back cross plate also secured to said side members and also having a formation adapting it to receive a sensitized surface holder, a metallic mirror frame having a mirror mounted therein, said mirror frame being fixedly secured to said side members in permanent, precisioned, angular relation to each of said holder-receiving formations, thereby providing a self-contained, unitary, color separation, camera structure.

8. A camera structure adapted to be used in the making of color-separation negatives simultaneously, including an outer cushioning box enclosing the contained parts at least wholly at top and bottom and wholly at the two sides and constituting a permanent attached part of the camera, a mirror chassis structure composed wholly of metal parts, and adapted with a fixedly positioned mirror and mirror frame to be assembled wholly inside of and to be secured to said cushioning box, said chassis structure parts including two spaced side members, a top cross plate secured to said side members and having a formation adapting it to receive a sensitized surface holder, a back cross plate also secured to said side members and also having a formation adapting it to receive a sensitized surface holder, said two plate formations being at an angle of ninety degrees to each other, said side members being of open character but having inclined portions extending downwardly thereacross at an angle of forty-five degrees to each of said two plate formations, a metallic mirror frame having a mirror mounted therin, said mirror frame being fixedly secured to said inclined portions of said side members, in permanent, precisioned, angular relation of forty-five degrees to each of said holder-receiving formations, thereby providing a self-contained, unitary, color separation, camera structure.

EDSON S. HINELINE.